US012070772B2

(12) United States Patent
Axman et al.

(10) Patent No.: US 12,070,772 B2
(45) Date of Patent: Aug. 27, 2024

(54) DEVICES, SYSTEMS AND PROCESSES FOR IMPROVING FREQUENCY MEASUREMENTS DURING REVERBERATION PERIODS FOR ULTRA-SONIC TRANSDUCERS

(71) Applicant: SEMICONDUCTOR COMPONENTS INDUSTRIES, LLC, Scottsdale, AZ (US)

(72) Inventors: Zdenek Axman, Sebetov (CZ); Tomas Suchy, Brno (CZ); Petr Kamenicky, Brno (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 18/456,973

(22) Filed: Aug. 28, 2023

(65) Prior Publication Data

US 2023/0405634 A1 Dec. 21, 2023

Related U.S. Application Data

(63) Continuation of application No. 16/867,298, filed on May 5, 2020, now Pat. No. 11,759,822.

(60) Provisional application No. 62/963,820, filed on Jan. 21, 2020.

(51) Int. Cl.
*B06B 1/02* (2006.01)
*G10K 9/122* (2006.01)

(52) U.S. Cl.
CPC ............ *B06B 1/0215* (2013.01); *G10K 9/122* (2013.01); *B06B 2201/30* (2013.01); *B06B 2201/55* (2013.01)

(58) Field of Classification Search
CPC ........... G05B 2219/37016; G05B 2219/37184; H04B 17/104; H04B 2001/305; H04L 25/061
See application file for complete search history.

(56) References Cited

U.S. PATENT DOCUMENTS

| | | | |
|---|---|---|---|
| 4,074,070 | A | 2/1978 | Gaus |
| 4,122,725 | A | 10/1978 | Thompson |
| 4,533,795 | A | 8/1985 | Baumhauer |
| 4,543,577 | A | 9/1985 | Tachibana |
| 4,586,172 | A | 4/1986 | Vernet |

(Continued)

FOREIGN PATENT DOCUMENTS

| | | | |
|---|---|---|---|
| DE | 20120201100 | A1 | 8/2013 |
| GB | 2483337 | A | 3/2012 |

OTHER PUBLICATIONS

Hustava, Marek, "Piezoelectric Transducer Controller Having Model-Based Sideband Balancing","U.S. Appl. No. 16/724,783", filed on Dec. 23, 2019.

(Continued)

*Primary Examiner* — Isam A Alsomiri
*Assistant Examiner* — Joseph C Fritchman
(74) *Attorney, Agent, or Firm* — Brake Hughes Bellermann LLP

(57) ABSTRACT

Embodiments include a primary short circuit coupled to a primary side of a transformer and a dampening element, coupled to a transducer coupled to a secondary side of the transformer, configured to dampen a received signal during a portion of a reverberation period.

21 Claims, 14 Drawing Sheets

(56) References Cited

U.S. PATENT DOCUMENTS

| | | | |
|---|---|---|---|
| 4,858,203 | A | 8/1989 | Hansen |
| 5,079,751 | A | 1/1992 | Woodward |
| 5,161,537 | A | 11/1992 | Hashimoto |
| 5,358,466 | A | 10/1994 | Aida |
| 5,724,313 | A | 3/1998 | Burgess |
| 6,661,285 | B1 | 12/2003 | Pompei et al. |
| 6,731,569 | B2 | 5/2004 | Yurchenko |
| 6,798,828 | B1 | 9/2004 | Phanse |
| 7,408,448 | B2 | 8/2008 | Li |
| 8,154,955 | B2 | 4/2012 | Yoshida |
| 8,416,641 | B2 | 4/2013 | Horsky et al. |
| 8,699,299 | B2 | 4/2014 | Horsky |
| 10,179,346 | B2 | 1/2019 | Kutej et al. |
| 10,418,994 | B1 | 9/2019 | Cullen et al. |
| 10,966,021 | B2 | 3/2021 | Koudar et al. |
| 11,163,308 | B2 | 11/2021 | Alawieh et al. |
| 11,759,822 | B2 * | 9/2023 | Axman .................. G10K 9/122 310/316.01 |
| 2001/0012238 | A1 | 8/2001 | Iwasaki |
| 2003/0039171 | A1 | 2/2003 | Chiapetta |
| 2003/0060094 | A1 | 3/2003 | Motsenbocker |
| 2003/0154792 | A1 | 8/2003 | Katayama |
| 2004/0090195 | A1 | 5/2004 | Motsenbocker |
| 2006/0103426 | A1 | 5/2006 | Lee et al. |
| 2008/0195284 | A1 | 8/2008 | Hammadou |
| 2009/0009306 | A1 | 1/2009 | Magane et al. |
| 2009/0135672 | A1 | 5/2009 | Matsuura et al. |
| 2009/0196428 | A1 | 8/2009 | Kim |
| 2010/0199773 | A1 | 8/2010 | Zhou |
| 2012/0286859 | A1 | 11/2012 | Libert et al. |
| 2014/0293746 | A1 | 10/2014 | Tran et al. |
| 2014/0331772 | A1 | 11/2014 | Klotz |
| 2015/0063073 | A1 | 3/2015 | Takahata |
| 2015/0078130 | A1 | 3/2015 | Urban |
| 2015/0154048 | A1 | 6/2015 | Alshinnawi et al. |
| 2015/0243273 | A1 | 8/2015 | Wu et al. |
| 2015/0260833 | A1 | 9/2015 | Schumann et al. |
| 2016/0106393 | A1 * | 4/2016 | Kameishi .............. B06B 1/0607 600/459 |
| 2016/0357187 | A1 | 12/2016 | Ansari |
| 2016/0380640 | A1 | 12/2016 | Boser |
| 2017/0074977 | A1 | 3/2017 | Koudar et al. |
| 2017/0115382 | A1 | 4/2017 | Koudar et al. |
| 2017/0168151 | A1 | 6/2017 | Kim |
| 2017/0318390 | A1 | 11/2017 | Bjork |
| 2017/0363459 | A1 | 12/2017 | Kim |
| 2018/0095059 | A1 | 4/2018 | McQuillen et al. |
| 2018/0160226 | A1 | 6/2018 | Hustava et al. |
| 2019/0025415 | A1 | 1/2019 | Suchy et al. |
| 2019/0079173 | A1 | 3/2019 | Kutej et al. |
| 2019/0212423 | A1 | 7/2019 | Hustava et al. |
| 2019/0377074 | A1 | 12/2019 | Sugae |
| 2020/0153653 | A1 | 5/2020 | Hustava et al. |
| 2020/0200898 | A1 | 6/2020 | Hustava et al. |
| 2020/0400803 | A1 | 12/2020 | Suchy et al. |

OTHER PUBLICATIONS

Hustava, "Detection of Noise-Induced Ultrasonic Sensor Blindness", U.S. Appl. No. 16/254,882, filed Jan. 23, 2019.

China Application Serial No. 202022136114.2, Office Action, Apr. 30, 2021 (Machine Translation).

China Application Serial No. 202022136114.2, Response to Office Action, Jul. 12, 2021 (Machine Translation).

* cited by examiner

DEVICES, SYSTEMS AND PROCESSES FOR IMPROVING FREQUENCY MEASUREMENTS DURING REVERBERATION PERIODS FOR ULTRA-SONIC TRANSDUCERS

CROSS REFERENCE TO RELATED APPLICATIONS

The present application is a continuation application of U.S. patent application Ser. No. 16/867,298, filed May 5, 2020, which claims priority to and benefit of U.S. Provisional Application Ser. No. 62/963,820, filed on Jan. 21, 2020, these applications are incorporated by reference herein in their entireties.

The present application also relates to co-pending U.S. application Ser. No. 15/888,543, which was filed on Feb. 8, 2018, in the name of inventors Jiri Kutej et al., and entitled "Response-Based Determination of Piezoelectric Transducer State." The entirety of this application is incorporated herein by reference.

TECHNICAL FIELD

The technology described herein generally relates to devices, systems, and processes for detecting obstacles. The technology also relates to parking assist sensors and other sensors used for detecting obstacles. The technology also relates to uses of ultra-sonic sensors to detect obstacles. The technology also relates to determining an operating frequency for a transducer. The transducer may be used in an ultra-sonic sensor. The technology also relates to determining the operating frequency of transducer based upon a measurement of one or more reverberations following a transmission of a ranging signal by a transducer.

BACKGROUND

Today, various sensor systems are used with motor vehicle and other systems. Examples of such sensor systems include parking assist sensors, back-up sensors, blind spot detection sensors, collision avoidance, and others (collectively, herein each sensor a "PAS" sensor and a collection of sensors forming a PAS system). PAS systems are often used to assist a vehicle driver during parking, such a parallel parking, during lane changes, collision avoidance, and otherwise. A vehicle driver may range from a person to a fully automated/self-driving driving vehicle system. A PAS system often operates based upon sonar type principles, whereby an ultra-sonic soundwave is emitted and, based upon the reception of an echo, obstacles (if any) to be avoided are detected. Such obstacles may be of any form or type including, but not limited to, other vehicles, pedestrians, animals, fixtures (such as light poles, building portions and the like), and otherwise. The obstacle may be fixed or moving.

PAS systems typically are configured to detect obstacles over varying distances from the sensor, using sonar principles, and based upon a lapse of time between an emitting of a ranging signal and a reception of an echo, with the emission and reception being performed commonly by the same transponder. As is commonly known, a PAS sensor commonly emits ranging signals using a piezoelectric transducer (herein, a "transducer"). The ranging signals may be emitted as one or more pulses (or bursts of ultra-sonic sound waves). Any resulting echoes are also commonly received by the transducer, after a reverberation period has elapsed. During the reverberation period, operating characteristics for the PAS sensor are commonly measured.

Yet, transducers, which are commonly used in combination with a secondary coil of a transformer coupled thereto, commonly gives rise to a series resonance and a parallel resonance. System designers often seek to eliminate the parallel resonance so that PAS sensor operating characteristics can be more precisely determined.

Various known approaches for eliminating the parallel resonance exist. However, when such parallel resonance is eliminated, a DC voltage shift (an increase) will commonly occur in a received signal provided by the transducer to a receiver component. Such DC shift delays and otherwise adversely influences measurement of one or more PAS sensor characteristics, as detected by the receiver, during the reverberation period.

Accordingly, devices, system and processes are needed for dampening and/or suppressing the DC shift arising in a received signal for a PAS sensor, where any parallel resonance influences of a transducer and other external components, such as a transformer, have been eliminated, to facilitate more precise PAS sensor operating characteristic measurements during the reverberation period for a PAS sensor.

SUMMARY

The various embodiments of the present disclosure describe devices, systems, and processes for improving frequency measurements during reverberation periods for PAS sensors. For at least one embodiment, devices, systems and processes for dampening a DC shift present in a received signal provided to a receiver for a PAS sensor are described. For at least one embodiment, devices, systems and processes for preventing an occurrence of a DC shift in a received signal provided to a receiver for a PAS sensor are described.

In accordance with at least one embodiment of the present disclosure, a process may include activating a primary short circuit coupled to a primary side of a transformer and activating a dampening element coupled to a transducer coupled to a secondary side of the transformer. For at least one embodiment, the transducer may be configured to generate a received signal during at least a transmission period and a reverberation period. The dampening element may be coupled to the transducer and configured to dampen the received signal during at least a portion of a reverberation period.

For at least one embodiment, the primary short circuit and the dampening element may be activated substantially simultaneously.

For at least one embodiment, the primary short circuit may be coupled to a set of first inductive coils of the transformer. The secondary side of the transformer includes a second inductive coil. Activation of the primary short circuit mitigates a parallel resonance arising from a combination of the second inductive coil, a transducer parallel capacitor, and an external capacitor. During activation of the primary short circuit, the received signal is increased by a DC shift voltage.

For at least one embodiment, the dampening element, when activated, dampens the DC shift voltage. For at least one embodiment, the primary short circuit and the dampening element may be activated substantially simultaneously. For at least one embodiment, the received signal may be dampened by the dampening element prior to amplification of the received signal by an amplifier.

For at least one embodiment, activation of each of the primary short circuit and the dampening element facilitates at least one operation including mitigating the parallel resonance present during a reverberation period measurement and dampening the DC shift voltage. For at least one embodiment, the at least one operation may include accelerating an earlier measurement, during the reverberation period, of at least one operating characteristic for the PAS sensor. For at least one embodiment, the at least one operation may facilitate a more precise measurement, during the reverberation period, of at least one operating characteristic for the PAS sensor. For at least one embodiment, the at least one operating characteristics is an operating frequency for the transducer.

In accordance with at least one embodiment of the present disclosure, a PAS sensor may include a transformer having a primary side and a secondary side The sensor may also include a primary short circuit coupled to the primary side of the transformer and a transducer, coupled to the secondary side of the transformer, configured to generate a received signal. The received signal may be generated over at least a reverberation period and an echo period. The sensor may also include a dampening element, coupled to the transducer, configured to dampen a DC shift voltage in the received signal during at least a portion of the reverberation period.

For at least one embodiment, the PAS sensor may include a controller configured to activate each of the primary short circuit and the dampening element. Upon activation of the primary short circuit and absent dampening of the DC shift voltage, a received signal amplitude may be increased by the DC shift voltage above a receiver input limit. For at least one embodiment, upon activation of the dampening element, the DC shift voltage is dampened. For at least one embodiment, dampening of the DC shift voltage facilitates earlier and more precise determination of at least one operating characteristic of the PAS sensor. For at least one embodiment, the at least one operating characteristic is an operating frequency for the transducer.

For at least one embodiment, the controller may be further configured to determine when the transducer has entered into the reverberation period and, after a settling stage, activate each of the primary short circuit and the dampening element.

For at least one embodiment, the dampening element may include a first dampening resistor coupled to each of the transducer and a high terminal of an amplifier, such as a low noise amplifier, and a first dampening switch switchable coupling the first dampening resistor to a second potential.

For at least one embodiment, the PAS sensor may include a second capacitor having a first end coupled to the transducer and a second end coupled to each of the first dampening resistor and to the high terminal of the amplifier. When the primary short circuit is activated, and absent activation of the dampening element, the second capacitor increases the received signal by the DC shift voltage. For at least one embodiment, the echo period begins when the received signal crosses an echo detection threshold. The controller may be configured to deactivate each of the primary side short and the dampening prior to the echo period beginning.

In accordance with at least one embodiment of the present disclosure a process may include detecting a zero-crossing for a received signal generated by a transducer in a PAS sensor. The transducer generates the received signal during at least a reverberation period. The process may further include activating a primary short circuit, coupled to a primary side of a transformer, within a determined time of the zero-crossing. The secondary side of the transformer is coupled to the transducer. Upon activation of the primary short circuit a parallel resonance otherwise arising during the reverberation period is mitigated.

For at least one embodiment, the process may include activating a dampening element. The dampening element is coupled to the transducer and configured to dampen the received signal during at least a portion of the reverberation period. For at least one embodiment, the primary short circuit and the dampening element may be activated substantially simultaneously. The dampening element, when activated, decreases the received signal while the primary side short is activated. For at least one embodiment, the process may also include measuring, at an earlier time and more precisely during the reverberation period than would occur absent activation of at least the primary short circuit, at least one operating characteristic for the PAS sensor.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems and processes for dampening a DC shift in a received signal for a PAS sensor during a primary side short period (PSSP) of a reverberation period (RP). As used herein, "dampening" (and its conjugates) refers to the dampening, reduction and/or elimination of a DC shift from a received signal for a PAS sensor.

Figure 1A:
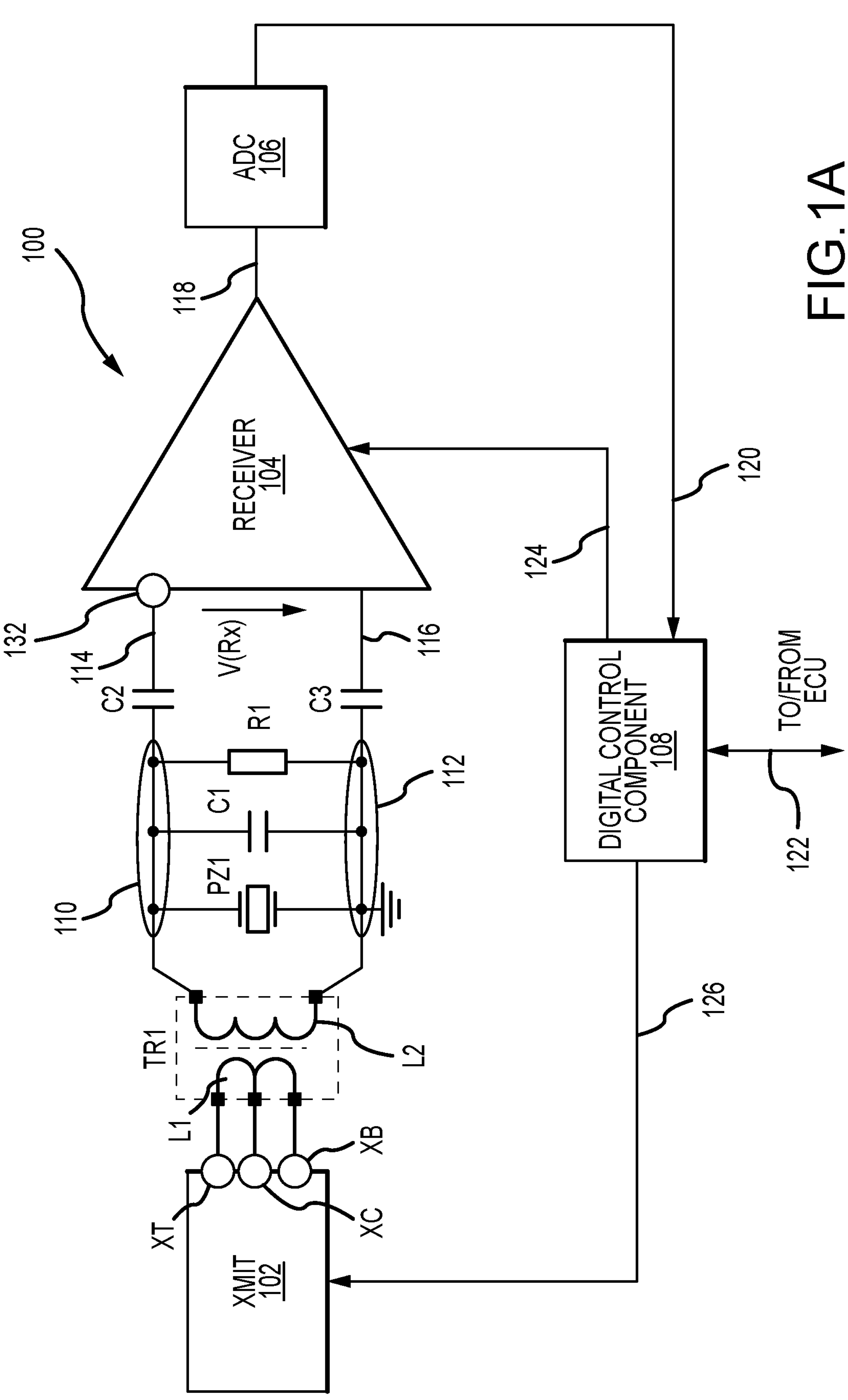
FIG.1A (PRIOR ART)
FIGS. 1A to 1C are a schematic diagrams of a prior art PAS sensor.
Figure 1C:
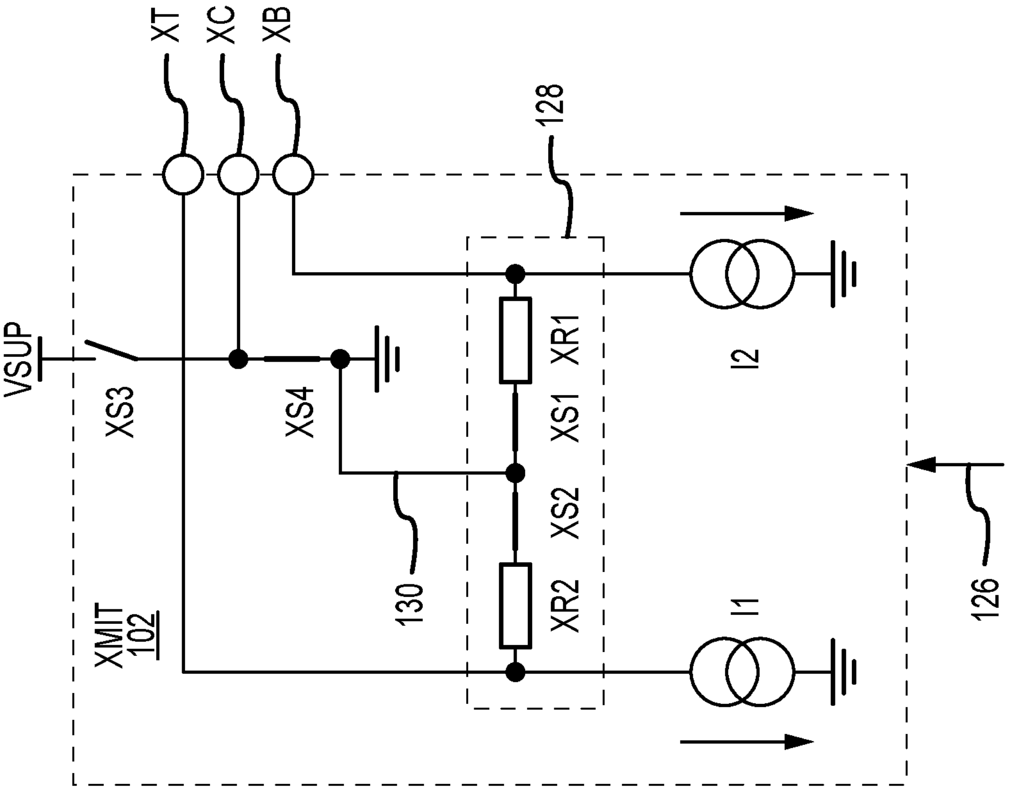
FIG.1C (PRIOR ART)
Figure 1B:
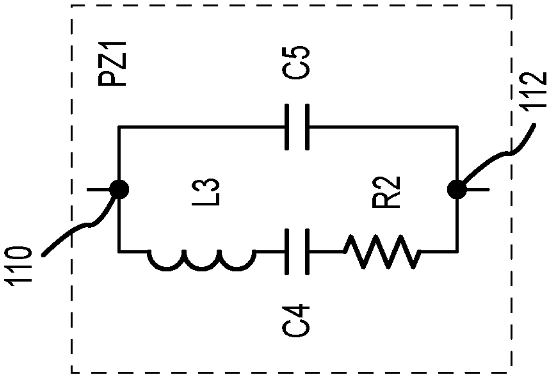
FIG.1B (PRIOR ART)

As shown in FIGS. 1A to 1C, a PAS sensor 100 often includes a transmitter 102 coupled to a set of first inductive coils L1 located on a primary side of a transformer TR1. A second inductive coil L2 located on a secondary side of the transformer TR1 is coupled to transducer PZ1 which emits one or more ranging signals and receives one or more received signals. Such emissions and reception often occur at ultra-sonic frequencies, such as 50 kHz or otherwise. One or more circuit elements are provided for use in controlling such emissions, determining frequencies and other components of emitted ranging signals, and processing received echo signals. One non-limiting example of such a PAS sensor 100 is described in greater detail, for example, in the '543 App.

As shown in FIG. 1A, the transducer PZ1 is commonly coupled to a receiver 104 by a parallel circuit configuration that includes a first capacitor C1 and a first resistor R1. The first capacitor C1 is commonly matched with the inductance and capacitance provided by the second inductive coil L2. R1 is commonly selected so that the reverberation signal is optimally damped. For at least one embodiment, R1 is 12 kΩ. Given that peak-to-peak voltages generated by the transformer TR1 may include 200 volts, or more, overvoltage protection for the receiver 104 is commonly provided by a second capacitor C2 and, optionally, a third capacitor C3. It is commonly appreciated that C3 may be used to provide symmetricity of receiver inputs for better EMC. For at least one embodiment, C2 and C3 (when used) may be coupling capacitors useful for splitting the received signal 114 between a high voltage domain (which commonly arises while the transducer PZ1 is transmitting) and a low voltage domain (which commonly arises while the transducer PZ1 is receiving echoes). Such voltage domains may vary by approximately 200 volts, peak-to-peak. It is commonly appreciated that voltages generated by the transducer PZ1 while one or more ranging signals are emitted (herein, "ranging voltages") will also be received by the transducer PZ1. Absent the overvoltage protections provided by the second capacitor C2, such ranging voltages may overload the receiver 104.

As shown in FIG. 1B, the transducer PZ1 is often a piezo-electric transducer which can be electrically modeled as including a serial resonant circuit (SRC), formed within the transducer PZ1 by third inductor L3 and a fourth capacitor C4, and a parallel resonant circuit (PRC), formed by a combination of the secondary inductive coil L2, a fifth capacitor C5, which arises from the electrical modelling of the transducer PZ1, and the first capacitor C1.

Several factors may influence performance of the transducer PZ1 including, but not limited to, manufacturing process used, operating temperature, age, and others. Given such variability, it is to be appreciated that the SRC may be used to define an exact frequency at which a PAS sensor 100 is able to achieve a desired performance level. Accordingly, to improve performance, by adjusting C1, the PRC can be tuned to be sufficiently close to the SRC so that a desired quality factor (Q) for the transducer PZ1 can thereby be realized. For some implementations, tuning commonly includes appropriate matching of the resistance provided by the first resistor R1 with a total capacitance provided by the first capacitor C1 (shown in FIG. 1A) and the fifth capacitor C5. Further, PZ1 tuning often occurs during a reverberation period (as discussed below) due to a direct association of the SRC and transducer PZ1 frequency measured during the reverberation period. Further, it is commonly appreciated that a substantially similar matching of SRC and PRC and knowledge of a frequency of the SRC is commonly desired.

Further, it is to be appreciated that when the transducer PZ1 transmitting frequency is tuned to be in line with the SRC, a change in performance is readily detectable. Such change in performance may arise for a wide variety of reasons including, but not limited to, snow, ice, rain or mud obscuring the sensor, age, temperature, or otherwise. Further and in accordance with ISO26262, it is desirable to know the exact frequency of the transducer PZ1 in order to comply with various safety and other regulatory requirements.

As shown, the transducer PZ1, first capacitor C1, first resistor R1, and second capacitor C2 are commonly connected to a first node 110. The second capacitor C2 outputs a received signal 114 to the receiver 104. The received signal 114 may be referred to herein as having a high voltage potential. Each of the transducer PZ1, first capacitor C1, and first resistor R1 may be further coupled to a second node 112. The second node 112 may be grounded or otherwise provide a low impedance. The third capacitor C3 may be coupled to the second node 112 and may output, effectively, a low signal 116 to the receiver 104.

As is commonly known, the transducer PZ1 effectively operates over a given operating cycle that includes a transmit segment, during which a ranging signal is emitted by the transducer PZ1. For at least one embodiment, the desired operating frequency is 50 kHz. Such emissions of the ranging signal are detected by a receive side of the transducer PZ1 and the received signal 114 is generated and provided to the receiver 104.

As shown in FIG. 1C, the transmitter 102 may often be coupled to a supply voltage VSUP that is selectively coupled to a center terminal XC of the first coil L1 by third and fourth transmitter switches XS3 and XS4, respectively. A top terminal XT and a bottom terminal XB of first coil L1 are respectively coupled to first and second current sources I1 and I2. The transmitter 102 may include a primary short circuit 128 configured for use during a primary side short period (PSSP). The primary short circuit 128 may include a first transmit resistor XR1 coupled by a first transmit switch XS1 to a third node 130. The third node 103 may be grounded or otherwise provide a defined impedance. A second transmit resistor XR2 is also coupled to the third node 130 by a second transmit switch XS2.

Figure 2:
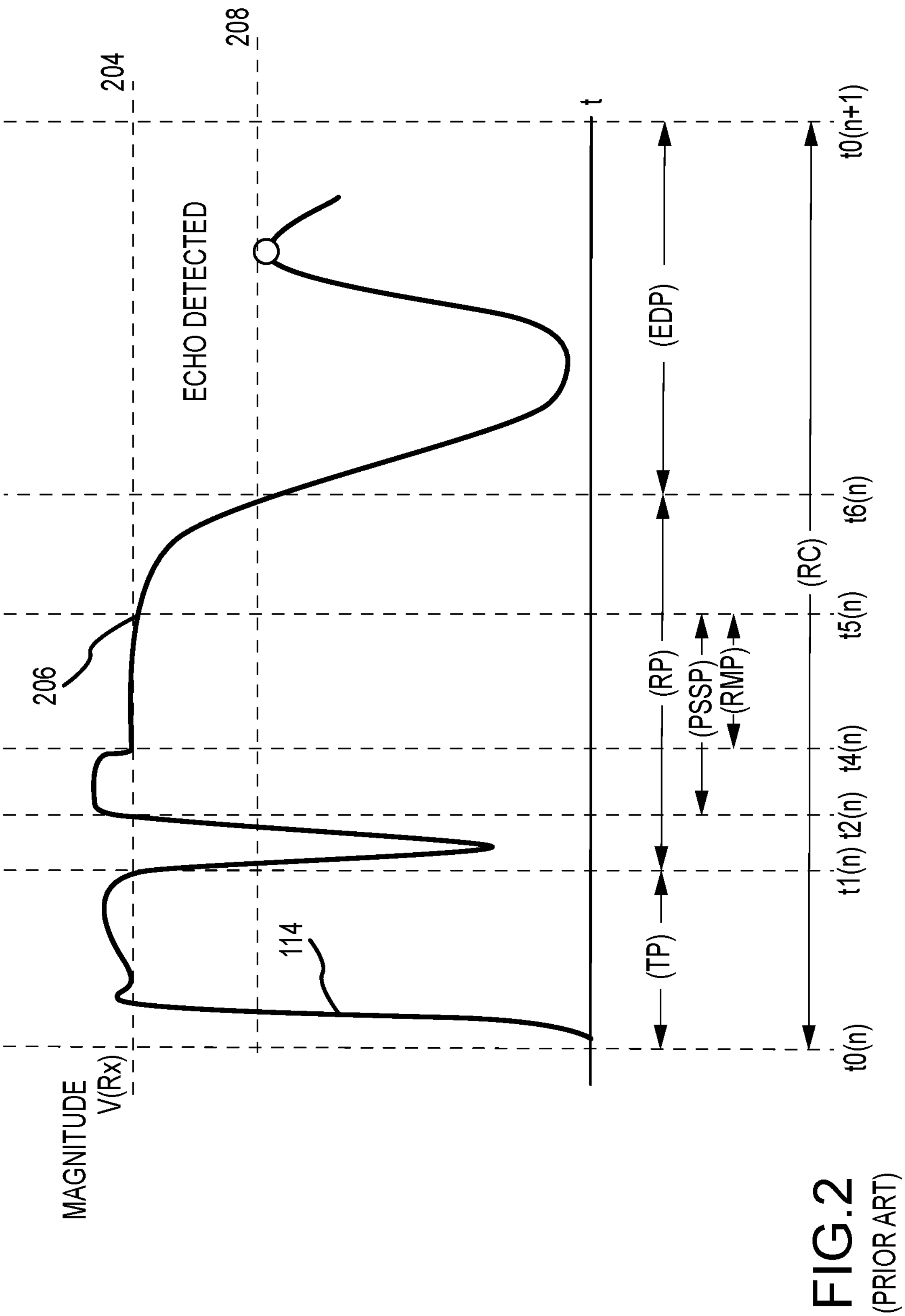
FIG.2 (PRIOR ART)
FIG. 2 illustrates a received signal over time, as received by a receiver for the prior art PAS sensor of FIGS. 1A to 1C.

Due to the coupling of the first coil L1 with the second coil L2, when the primary short circuit 128 is active, the shorting provided thereby is transferred to the second coil L2, then to the transducer PZ1, and ultimately into the received signal 114. It is to be appreciated that such transfer is based upon the rating factor of the transformer TR1 and results in the received signal being shifted (increased) by a DC component (herein, a "DC Shift"). While the DC shift is present, frequency measurements may not be possible due to received signal 114 exceeding a "receiver input limit" 204 (as shown in FIG. 2 and further discussed below). As used herein, "receiver input limit" refers to the known principle of receivers to clamp their output at a given level, such as level 204, versus dropping their AC gain to zero as may occur when a received signal has a DC component that exceeds a given limit.

As discussed in the '543 App and otherwise known in the art, during the primary side short period PSSP, the PRC is removed such that the received signal 114 is representative of transducer PZ1 performance based solely on the SRC and not based on both the SRC and PRC.

The various embodiments of the present disclosure facilitate the dampening of the DC Shift. Due to the received signal, earlier in the reverberation period, having a received voltage V(Rx) that is less than the receiver input limit 204, embodiments of the present disclosure facilitate more precise and earlier transducer PZ1 performance measurements. It is to be appreciated that the longer measurement period provided by embodiments of the present disclosure enable increased precision in such performance measurements.

As shown in FIG. 2, the received signal 114 can be defined to occur over a receive cycle (RC) having three components. First, a transmission period (TP) occurring from an initial/start time (t0(*n*)) thru a first time (t1(*n*)), where "n" is an integer designating a current operating cycle. TP is coincident with the emission of a ranging signal by the transducer PZ1. During the transmission period, emitted ranging signals are reflected into the receiving element of the transducer PZ1 and result in the ranging signal 114 during the TP. Such received signal exceeds a voltage input limit for the receiver 104 (herein, such limit is referred to as the receiver input limit 204).

Second, the receive cycle 202 includes a reverberation period (RP) that occurs from t1(*n*) thru a sixth time (t6(*n*)). During the reverberation period RP, electrical signals are generated in the transducer PZ1 due to on-going reverberations of the mechanical elements of the transducer PZ1. During a "first/settling stage" of the reverberation period RP, which is shown as occurring from t1(*n*) to t2(*n*), the received signal 114 behaves erratically. As shown in FIG. 2 for illustrative purposes only, such erratic behavior may include a magnitude drop that may arise by, for example, a phase shift. Other undesired behavior may occur during the first/settling stage. For at least one embodiment of the present disclosure, the first stage occurs for fifty microseconds (50 μs), plus/minus ten percent (10%). For other embodiments, the first/settling stage may last for any given period of time, including zero microseconds (0 μs), twenty microseconds (20 μs), or otherwise. The primary side short period PSSP follows the first stage and, as shown, occurs from t2(*n*) to t5(*n*). It is to be appreciated that the PSSP may begin at t1(*n*), but, commonly begins at t2(*n*). During PSSP, the DC Shift occurs for known PAS sensors 100, but, is dampened by embodiments of the present disclosure.

For known PAS sensors, the RP can be further divided into three additional stages including. a "second stage", a "third stage", and a "fourth stage." As shown in FIG. 2, the second stage occurs from t2(*n*) to t4(*n*) (time t3(*n*) is shown with reference to FIG. 6A and is discussed below), the third stage occurs from t4(*n*) to t5(*n*), and the fourth stage occurs from t5(*n*) to t6(*n*).

Figure 4:
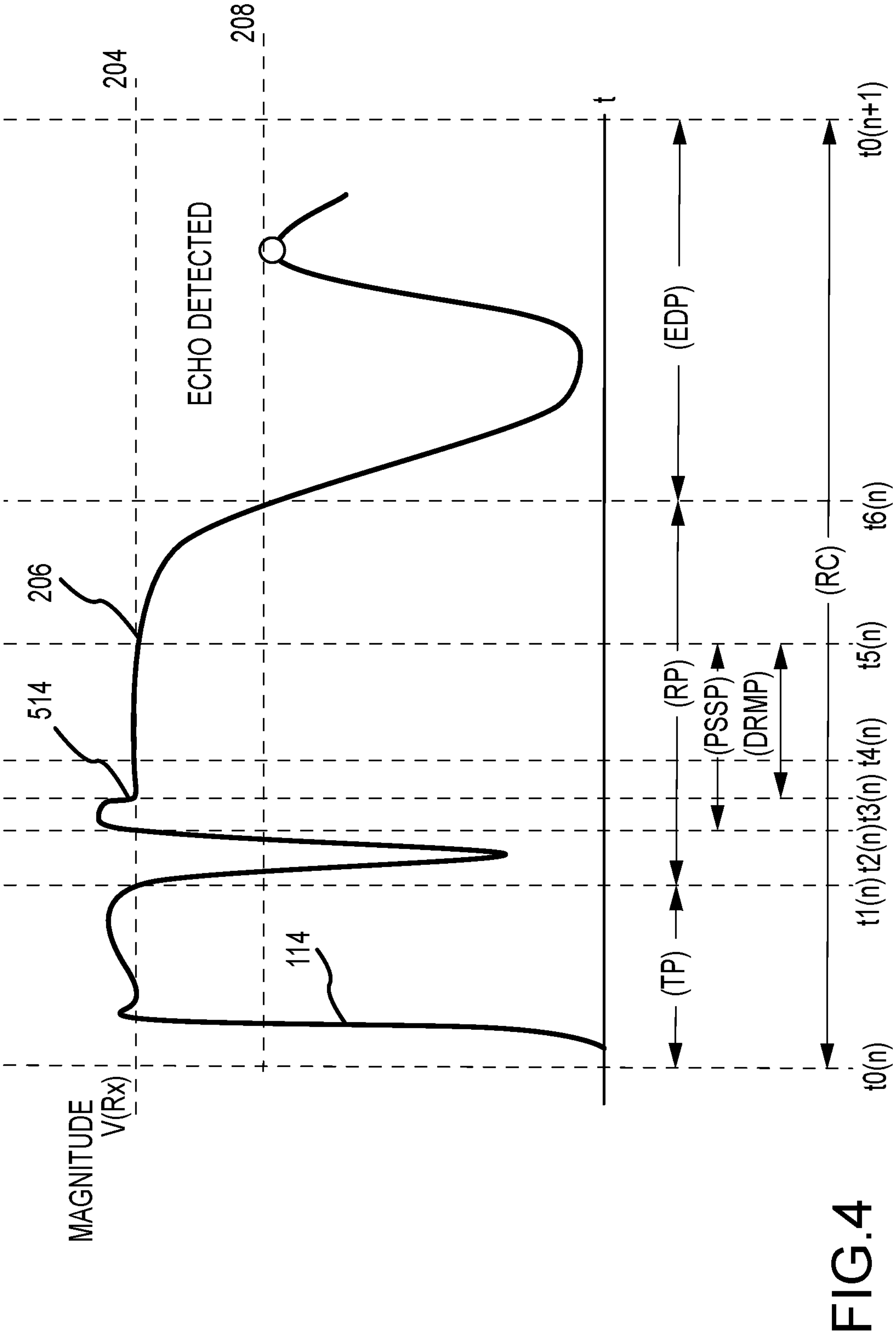
FIG. 4 illustrates a received signal over time, as received by a receiver for a dampening PAS sensor configured in accordance with at least one embodiment of the present disclosure.

Contrarily, and in accordance with at least one embodiment of the present disclosure, as shown in FIG. 4 and due to the dampening of the DC shift, a "dampened second stage" occurs from t2(*n*) to t3(*n*), a "dampened third stage" occurs from t3(*n*) to t5(*n*). The fourth stage remains and occurs from t5(*n*) to t6(*n*). Accordingly and for at least one embodiment, the dampened third stage begins earlier—at time t3(*n*) (as discussed in greater detail below)—as compared to the known, undampened third stage beginning at time t4(*n*).

As shown in FIG. 2 for known PAS sensors 100 and during the second stage t2-t4, the received signal 114 remains above the receiver input limit 204 due to the DC shift. At time t4, the received signal 114 falls below the receiver input limit 204 and PAS sensor 100 system measurements may begin. As used herein, the third stage t4(*n*) to t5(*n*) is also referred to interchangeably as a "reverberation measurement period" (RMP) for known systems. As shown in FIG. 4 and for at least one embodiment of the present disclosure, the dampened third stage t3(*n*) to t5(*n*) is also referred to as a "dampened reverberation measurement period" (DRMP). Since the DC shift is not dampened, for known PAS sensors 100 the DC shift remains present during the RMP. Only after the received signal 114 has sufficiently been reduced by naturally occurring signal decay and/or based on the influences of a high resistance 132 at the input of the receiver 104 can the RMP begin for known PAS sensors 100. Further, during the third stage t4(*n*) to t5(*n*), the voltage of the received signal 114 does not exceed the receiver input limit 204.

During the RMP and DRMP, the PAS sensor 100 is commonly configured to perform various measurements based on the received signal 114. During the RMP and DRMP, the received signal 114 and the dampened received signal 514 are respectively representative, at least in part, of one or more operating parameters for the PAS sensor 100.

Third, the receive cycle (RC) includes an echo detection period (EDP) occurring from t6(*n*) thru a beginning time t0(*n*+1) for a next operating cycle. Commonly, the EDP begins when the received signal 114 falls below a given echo detection threshold (EDT) 208. Prior to the EDP, the PAS sensor 100 may be saturated by noise, dominated by the reverberation signal, and/or otherwise incapable of obstacle detection. During the echo detection period (EDP) t6(*n*) to t0(*n*+1), the received signal 114 is generated in the transducer PZ1 primarily due to reflections of the ranging signal off of one or more obstacles and reception, by the transducer PZ1, of such reflections as one or more echo signals. Obstacle detections and other uses of the PAS sensor commonly occur during EDP. During EDP, the received signal 114 is commonly not dampened, but, may be dampened for a given embodiment.

As further shown and known, various circuit elements are also commonly used in a PAS sensor 100 to convert, monitor, process and otherwise manage the received signal 114 during each of the transmission period (TP), the reverberation period (RP), and the echo detection period (EDP). Such components commonly include an analog-to-digital converter (ADC) 106, and a digital control component 108. The functions and features of the ADC 106 and the digital control component 108 are well known in the art. The ADC receives an amplified signal 118 from the receiver 104 and outputs a digital signal 120. The digital control component 108 is often coupled to an electronic control unit (ECU) via which one or more data signals 122 are communicated. The digital control component 108 is commonly configured to provide one or more first control signals 124 to the receiver 104 and one or more second control signals 126 to the transmitter 102.

Figure 3:
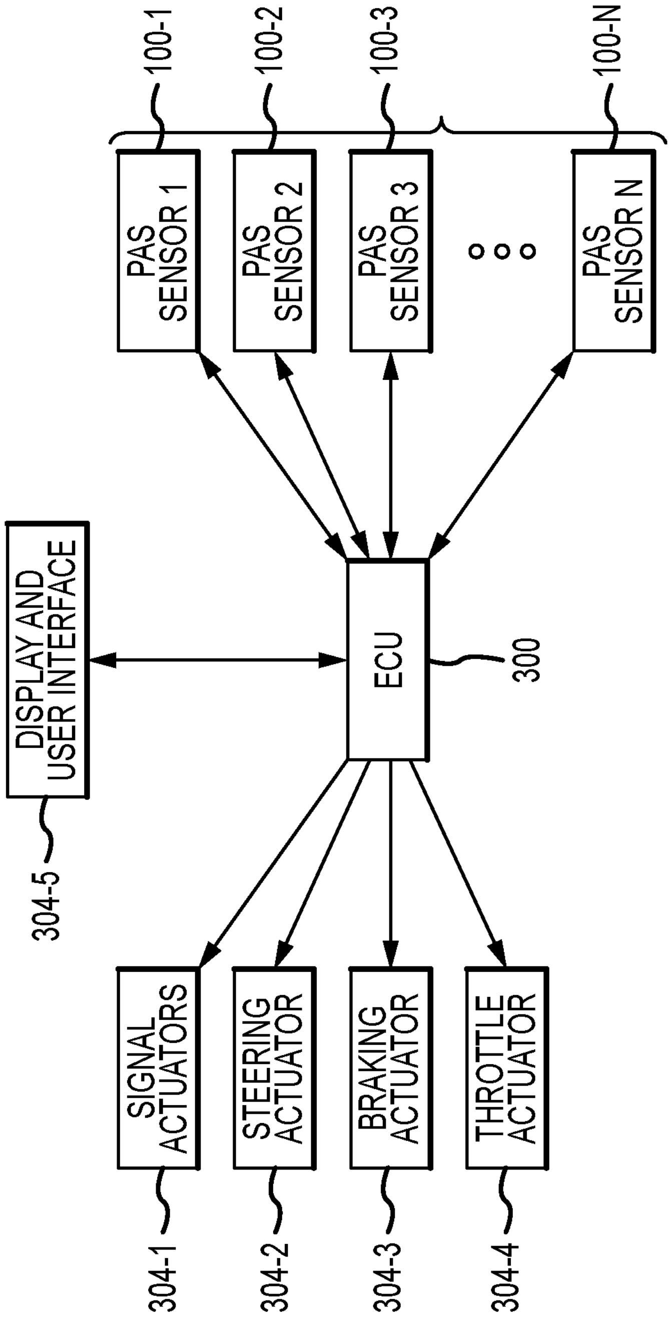
FIG.3 (PRIOR ART)
FIG. 3 is schematic diagram of a prior art PAS system that includes two or more PAS sensors 100 of FIGS. 1A to 1C.

As is commonly known and as shown in FIG. 3, the ECU 300 may be coupled to one or more sensors 100-1 to 100-N, and other vehicle components 304 including but not limited to one or more signal actuators 304-1, steering actuators 304-2, braking actuators 304-3, throttle actuators 304-5, display and user interfaces 304-6, and the like. Such components are well known in the art and are not further described herein.

Figure 6A:
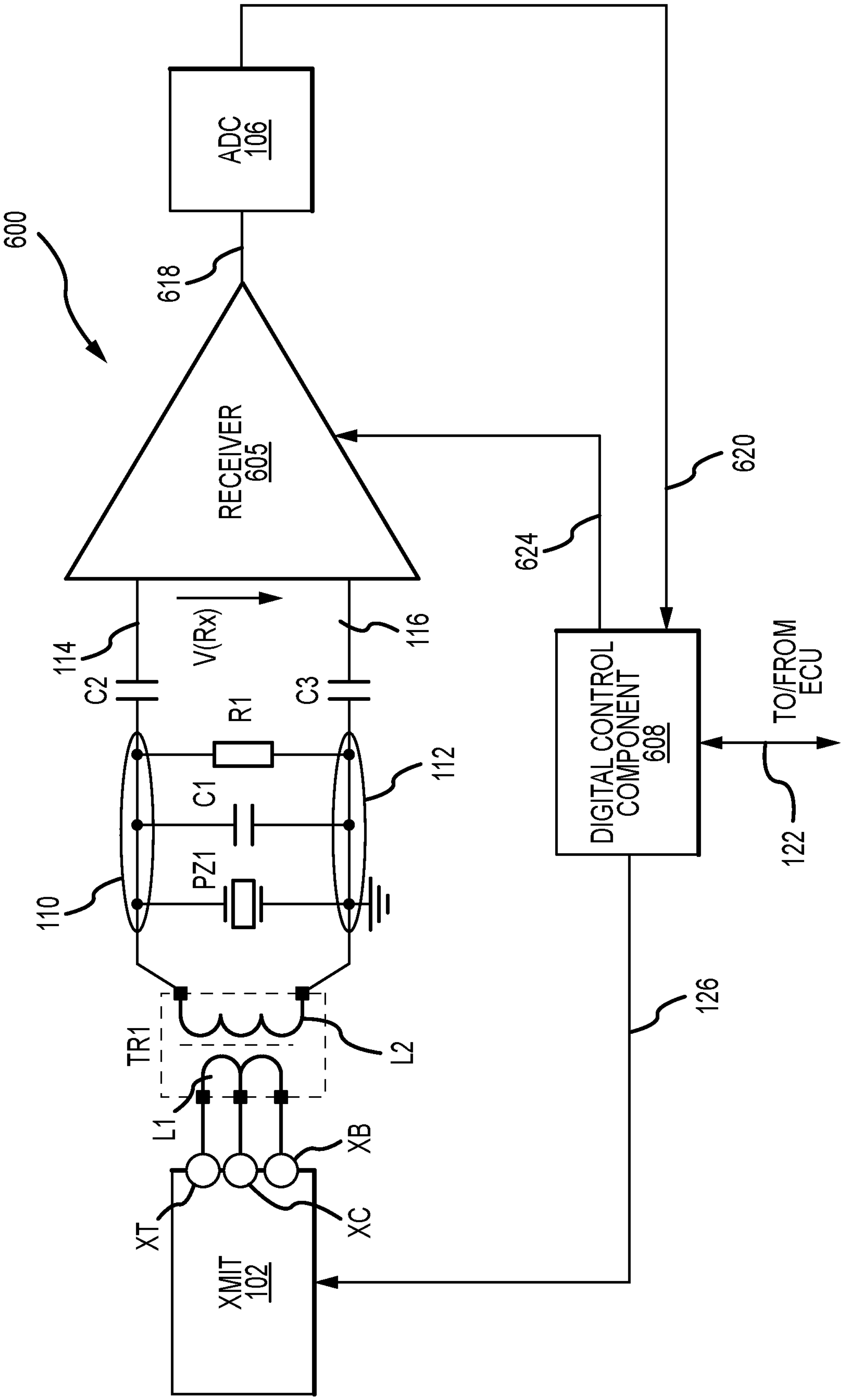
FIG. 6A is a schematic diagram of a dampening PAS sensor configured to dampen a DC shift in a received signal and in accordance with at least one embodiment of the present disclosure.

As shown in FIG. 4 and in accordance with at least one embodiment of the present disclosure, when the DC shift is dampened from the receive signal 114 and a dampened received signal 514 can be provided to a dampening receiver 605 (as shown in FIG. 6A).

More specifically, at least one embodiment of the present disclosure facilitates the providing of an earlier arising and/or more precise reverberation measurement period—such earlier arising period again being herein referred to as the DRMP. As shown and for at least one embodiment, the DRMP may begin at t3(*n*), versus the prior art RMP beginning at t4(*n*). Dampening of the DC shift results in a dampened received signal 514 that falls earlier below the receiver input limit 204 at an earlier time. It is to be appreciated that for at least one embodiment, t2(*n*) and t3(*n*) may occur substantially simultaneously. For at least one embodiment, t3(*n*) occurs within 51.2 μs of t2(*n*). For at least one embodiment, t3(*n*) occurs substantially 350 μs earlier than t4(*n*), herein the "earlier detection period". It is to be appreciated that the earlier detection period may be adjusted based upon a ratio of a dampening resistance provided by a first dampening resistor DR1 (as described below with reference to FIG. 6B) and the HR for a given receiver. For a non-limiting example, a dampening resistance of 10 kOhms as compared to an HR of 70 kOhms would result in a seven (7) times improvement of t3(*n*) versus t4(*n*).

Figure 5A:
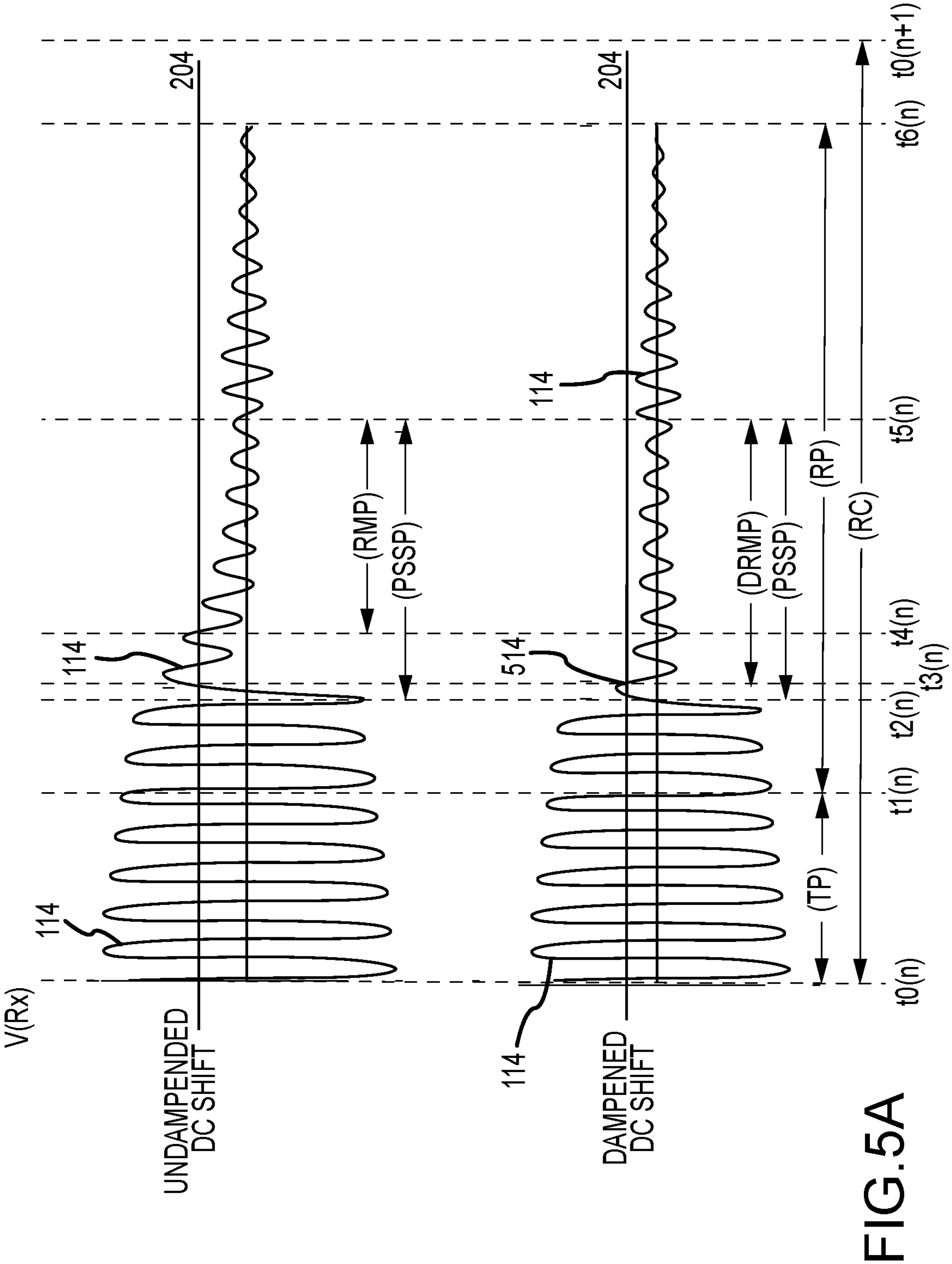
FIG. 5A illustrates a received signal over time, as received by a prior art PAS sensor and wherein a DC shift is not dampened, versus a dampened received signal over time, as received by a dampening PAS sensor and wherein the DC shift is dampened.

In FIGS. 5A, effects of not dampening and dampening the DC shift on the received signal 114 and a dampened received signal 514 are shown.

Figure 5B:
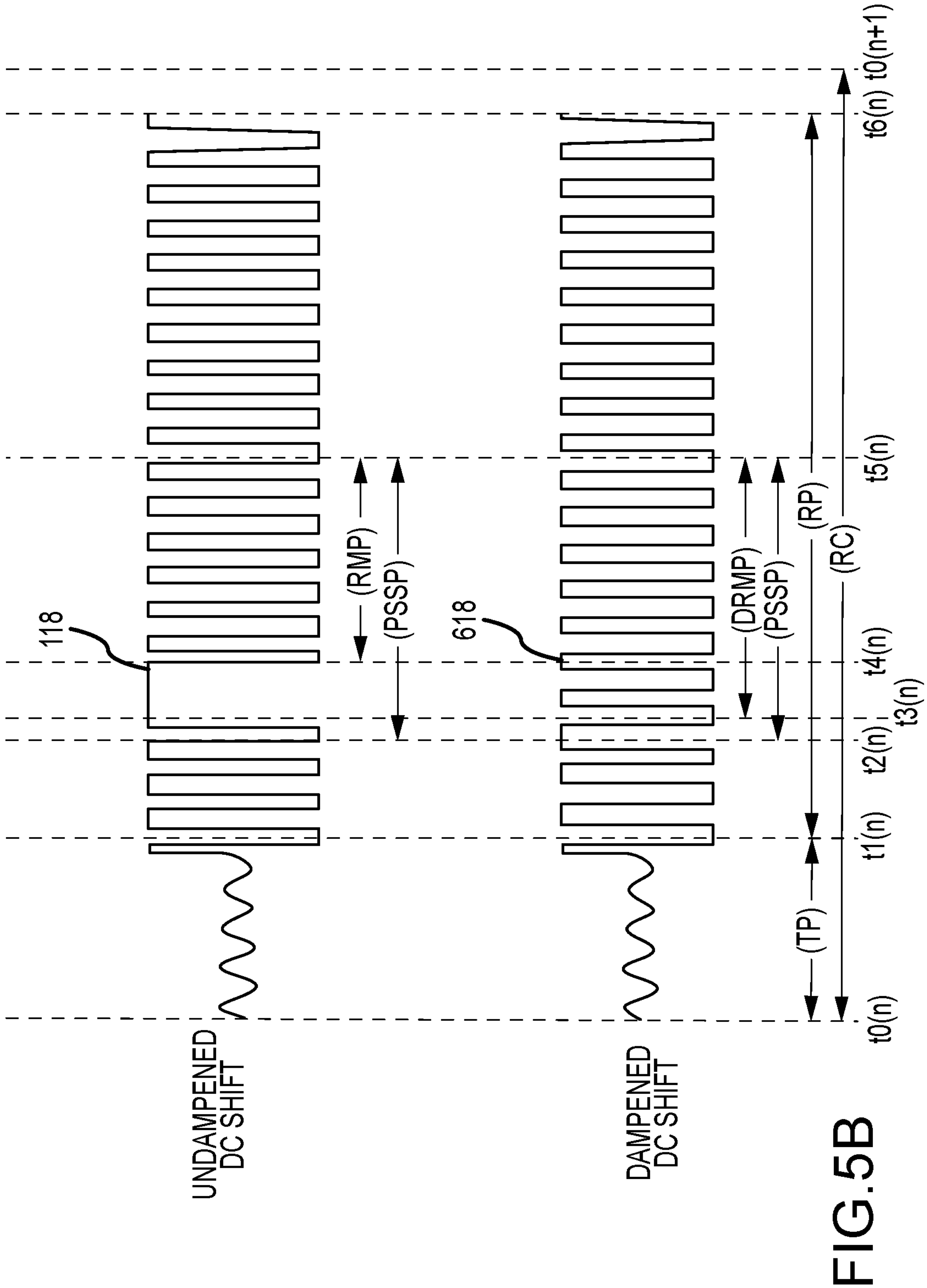
FIG. 5B illustrates an "amplified signal" (as described herein) over time, as provided by a prior art PAS sensor and wherein a DC shift in a received signal is not dampened, versus a "dampened amplified signal" (as described herein) over time, as provided by a dampening PAS sensor and wherein the DC shift in the received signal is dampened.

In FIG. 5B, effects of not dampening and dampening the DC shift on the amplified signal 118 versus a dampened amplified signal 618 are shown. As discussed above, the presence of the DC shift often prevents an earlier determination of one or more operating characteristics of the PAS sensor 100.

As shown in FIG. 5A, when the DC shift is not dampened, the voltage of the received signal 114 exceeds the receiver input limit 204. Such condition delays the RMP until t4(*n*). In comparison, when the DC shift is dampened in accordance with an embodiment of the present disclosure, the dampened received signal 514 results in the DRMP starting at t3(*n*), where t3(*n*) occurs before t4(*n*). It is to be appreciated that the actual DC voltages added to a received signal due to a DC shift and dampened by an embodiment of the present disclosure are circuit and implementation dependent. Using at least one embodiment of the present disclosure, a ninety percent (90%) reduction in such DC shift voltages may occur. Dampening of such DC shift facilitates earlier measurement of one or more operating characteristics for a PAS sensor. Likewise, in FIG. 5B, the amplified signal 118 generated by a non-dampening prior art PAS sensor 100 is shown and compared to a dampened amplified signal 618 generated in accordance with at least one embodiment of the present disclosure. Again, dampening of the DC shift facilitates an earlier occurring DRMP which results in the dampened digital signal 620 being available for use at t3(*n*), whereas for prior art PAS sensors 100 the digital signal 120 is not available until t4(*n*). It is to be appreciated that the amount of delay in received signal availability avoided by use of an embodiment of the present disclosure to dampen the DC shift is circuit and implementation dependent. Further, it is to be appreciated that for many known PAS sensors, the RMP may not of a sufficient duration for desired frequency measurements to be completed as reverberations may finish earlier than the RMP provides. Thus, by use of a DRMP, as per an embodiment of the present disclosure, a longer period for frequency measurement may be provided.

Further, it is to be appreciated that for at least one embodiment of the present disclosure, a ten percent (10%) reduction in the voltage of the received signal 114 (pre-dampening) may occur by dampening of the DC shift.

Figure 6B:
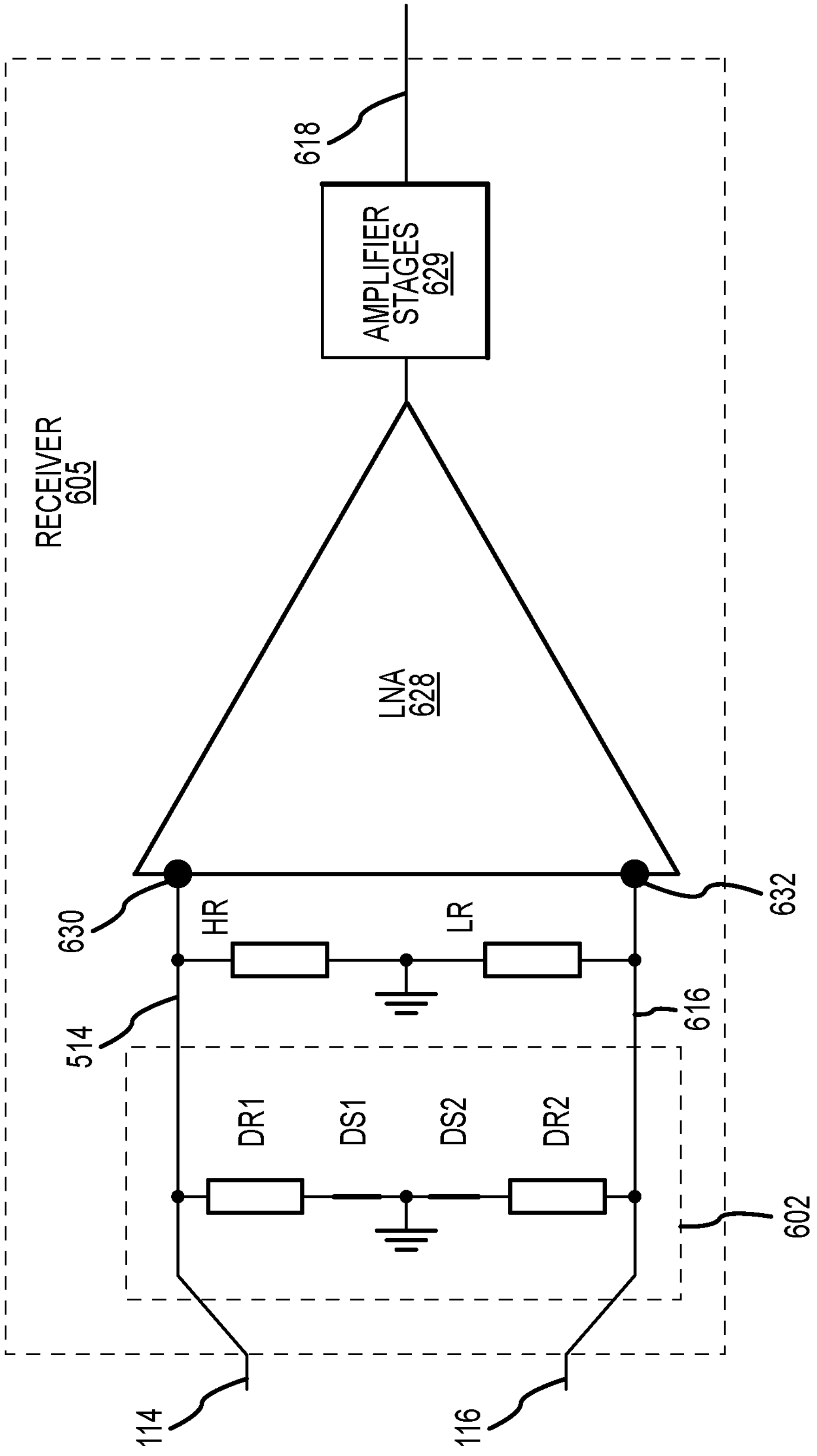
FIG. 6B is a schematic diagram of a receiver used in the dampening PAS sensor of FIG. 6A configured to dampen a DC shift in a received signal and in accordance with at least one embodiment of the present disclosure.

As shown in FIGS. 6A and 6B, a dampening PAS sensor 600 may include many circuit elements common to the PAS sensor 100 of FIG. 1A, including those shown in FIG. 1C and as described above. Herein, common components are commonly identified. Further, for at least one embodiment, the dampening PAS sensor 600 may include a dampening receiver 605. Elements of the dampening receiver 605 are shown in FIG. 6B.

More specifically and for at least one embodiment, the dampening receiver 605 may include a dampening element 602 configured to receive the received signal 114, dampen the DC shift in such signal during a portion of the reverberation period (RP), and output the dampened received signal 514. For at least one embodiment, dampening of the DC shift occurs by use of one or more voltage damping circuit elements. For at least one embodiment, dampening of the DC shift occurs by selectively coupling one or more resistors to a ground node or a low impedance node.

More specifically and as shown in FIG. 6B for at least one embodiment of the present disclosure, the dampening element 602 may include a first dampening resistor DR1 selectively coupled to a ground, reference or low impedance potential by a first dampening switch DS1. The first dampening resistor DR1 may be configured in a parallel circuit configuration with a low noise amplifier 628. The LNA 628 may be any suitable amplifier, as is commonly known and used in PAS sensors. The LNA 628 receives the dampened received signal 514 and, after any additional amplifier stages 629, outputs a dampened amplified signal 618.

For at least one embodiment, a second dampening resistor DR2 may be selectively coupled to a ground potential by a second dampening switch DS2. It is to be appreciated that use of each of the first dampening resistor DR1, the first dampening switch DS1, the second dampening resistor DR2, and the second dampening switch DS2 may be used to facilitate a full differential receiver input configuration with a high voltage (+) potential occurring at a high terminal 630 of the LNA 628 and a low voltage (−) potential occurring at a low terminal 632 of the LNA 628.

As further shown, the dampening receiver 605 may also include a high resistor (HR) and a low resistor (LR). HR and LR may also be coupled to a ground or other reference potential and used, in accordance with at least one embodiment, to facilitate dampening of any DC voltages arising during the echo detection period (EDP).

For at least one embodiment, the dampening element 602 dampens the DC shift arising due to respective activations of the first and second transmit switches XS1 and XS2 and while the primary short circuit 128 is enabled. More specifically and depending upon the then arising phase for a full differential receiver input configuration, capacitors C2 or C3 are respectively discharged by the first dampening resistor DR1 or the second dampening resistor DR2. For other configurations, only the second capacitor is discharged by the first dampening resistor DR1 during DRMP.

For at least one embodiment, the first dampening switch DS1 and the second dampening switch DS2 may be operated in synchronization with corresponding operation of the respective first transmit switch XS1 and the second transmit switch XS2. For at least one embodiment, the digital control 608 sends a first dampening control signal 624 to the dampening element 602 in synchronization with sending of a second control signal 126 to the transmitter 102. The second control signal 126 includes control signals for the first and second transmit switches XS1 and XS2 provided by the primary short circuit 128. For at least one embodiment, the dampening element 602 may be provided in conjunction with or separate from the dampening receiver 605.

For at least one embodiment, at least DR1 and, for full differential receivers, DR2 may be 10 kOhm resistive elements. For other embodiments, it is to be appreciated that DR1 and/or DR2 may be selected based upon a desired speed at which a DC shift, as provided by the second capacitor C2 to be dampened. For at least one embodiment, DR1 and/or DR2 may be selected such that the second capacitor C2 is discharged within substantially twenty microseconds (20 μs). For at least one embodiment, a time period needed to discharge the second capacitor C2 and dampen any DC shift component may be determined based upon an available reverberation time, where for a shorter reverberation time a fastener dampening of the received signal 114 is provided.

Further, it is to be appreciated that a full symmetrical receiver input configuration may be desired in view of electromagnetic compatibility (EMC) considerations. When EMC considerations are not present, the second dampening resistor DR2 and second dampening switch DS2 may not be utilized.

It is to be appreciated that for the embodiment of FIGS. 6A and 6B, the PAS sensor 600 need not be configured to determine when a zero crossing of the received signal occurs because each of the primary short circuit 128 and the dampening element 602 are operated in substantial synchronization.

Figure 7A:
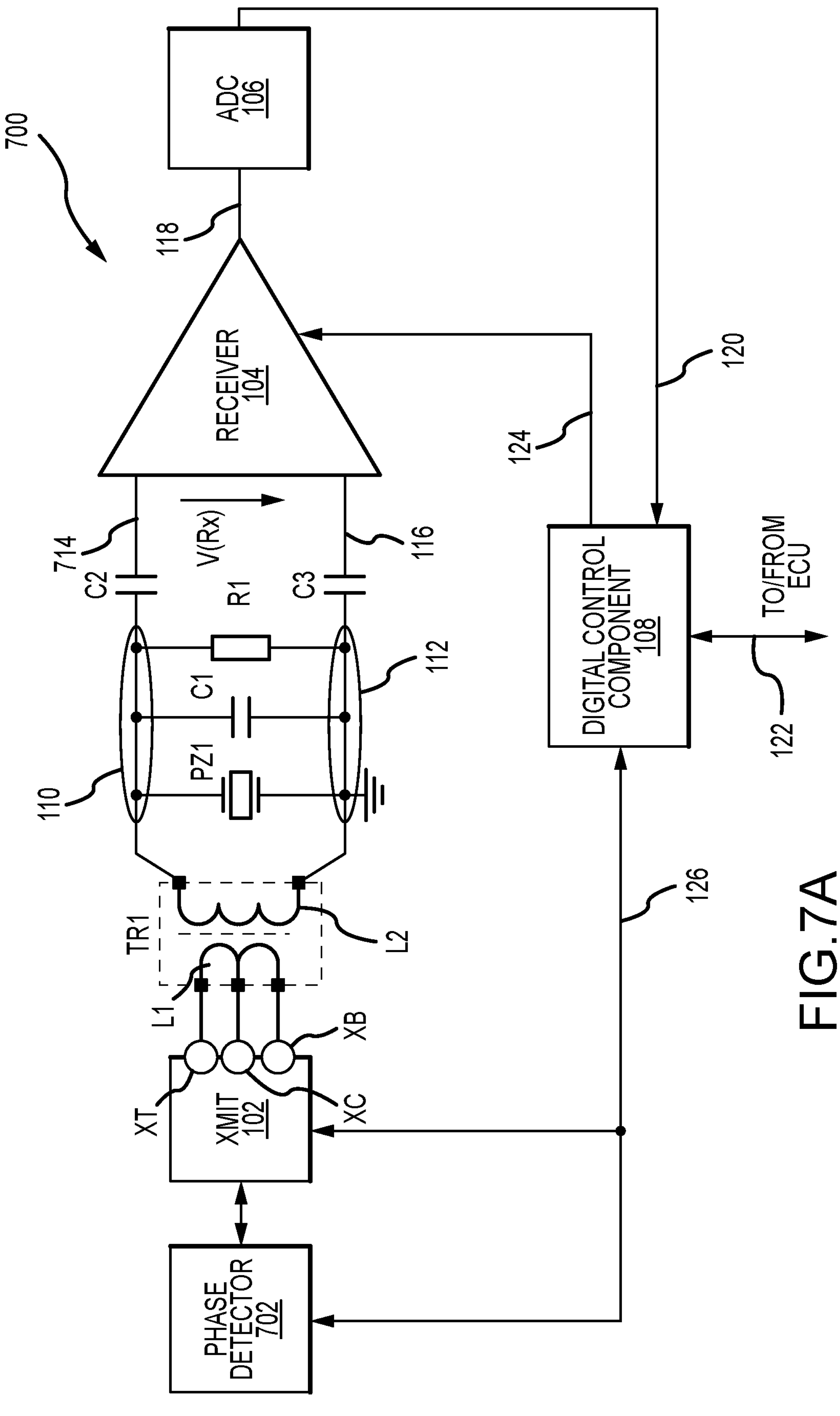
FIGS. 7A and 7B are a schematic diagram of a phase detecting PAS sensor configured in accordance with at least one embodiment of the present disclosure.
Figure 7B:
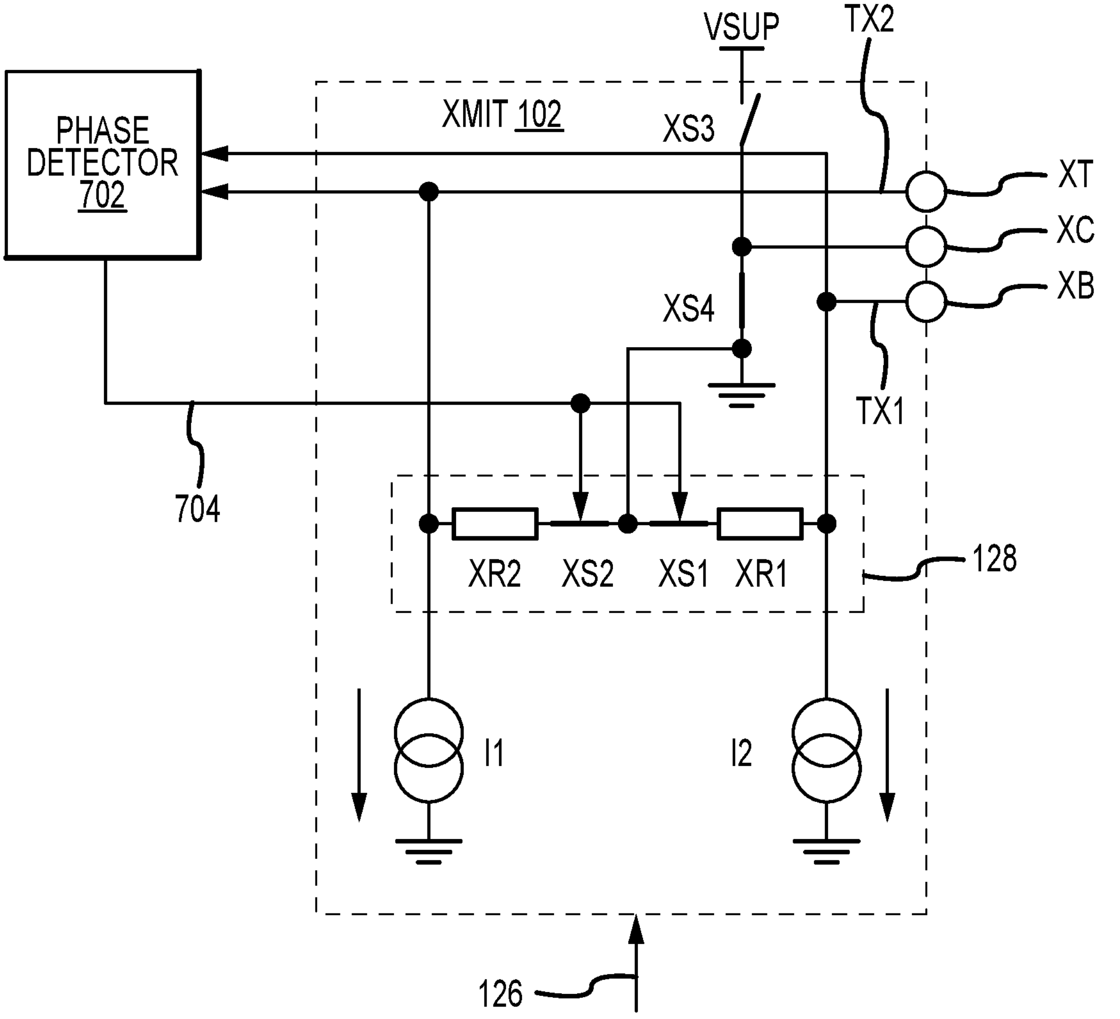

As shown in FIGS. 7A and 7B and for at least one embodiment of the present disclosure, a "dampening" of the DC shift may be accomplished by preventing the DC shift from arising. More specifically, a phase detecting PAS sensor 700 may be configured to control the primary short circuit 128 such that activation thereof occurs within a determined time of a zero-crossing or other change in one or more of a transmit voltage signal, a transducer voltage signal, the received signal voltage V(Rx), or another detectable signal arising within the PAS sensor.

It is to be appreciated, that for an ideal circuit, the determined time may arise substantially simultaneously with such a detected signal change. For non-ideal circuits, however, the determined time varies based upon characteristics of a given PAS sensor's circuitry, and the actual components used therein, including but not limited to characteristics of the second capacitor C2 and other circuit elements.

Accordingly, for at least one embodiment of the present disclosure, an iterative approach may be used to determine an amount of adjustment needed for the determined time. For one such iterative approach embodiment, for a first operating cycle, the PSSP is activated substantially simultaneously with a zero-crossing of a detectable signal, such as the transmit signal voltage, the transducer voltage signal, or otherwise and the DC shift then occurring is measured. For a second operating cycle, an adjustment (positive or negative in time) is made to the determined time, such that a corresponding adjustment in the activation of the PSSP, relative to a detected zero-crossing for the second operating cycle, results in a decrease in the DC Shift, as measured for the second operating cycle. Additional iterative adjustments in the determined time may be made until a desired reduction, if not complete elimination, of the DC Shift is realized.

For another embodiment, the predetermined time may be determined during fabrication of the PAS sensor, during an initialization phase for a PAS sensor, or otherwise. For at least one embodiment, the predetermined time may be algorithmically defined, based upon empirical analysis, simulations, or otherwise determined, in view of a DC Shift expected to arise for a given set of PAS sensor circuit components. It is to be appreciated that such algorithmic definition may be determined during initial testing of a PAS sensor, in a factory, or later testing of a PAS sensor in a field or other setting.

As shown, the phase detecting PAS sensor 700 may include many circuit elements common to the PAS sensor 100 of FIG. 1A, including those shown in FIG. 1C and as described above and as further modified in FIG. 7B. Herein, common components are commonly identified. Further, for at least one embodiment, the phase detecting PAS sensor 700 may include a phase detector 702 coupled to the transmitter 102. For at least one embodiment, the phase detector may be coupled to the digital control component 108 to receive second control signals 126. The phase detector 702 operates, via control signals 704, the first transmit switch XS1 and the second transmit switch XS2. For at least one embodiment, these first and second transmit switches may be activated within a determined time of a detectable change in the receiver signal 114. For at least one embodiment, such detectable change may be based upon a time derived phase of the transmitter differential outputs TX1 and TX2. For at least one embodiment, the determined time may be adjustable over one or more operating cycles. It is to be appreciated that when the primary short circuit 128 is substantially precisely activated, substantially no DC shift is introduced onto the received signal 114.

For other embodiments, it is to be appreciated that the phase detector 702 may be coupled to any circuit location at which the zero-crossing may be detected. Such locations include, but are not limited to, locations on the secondary side of the transformer TR1, such as, the first node 110, at the inputs to the receiver 104, and otherwise.

For at least one embodiment, a detection of a zero-crossing of or other change in the received signal 114 may occur with respect to currents induced in either the first inductive coils L1 or the second inductive coil L2. It is to be appreciated, however, that due to the instability of the received signal 114 during the first/settling stage (t1(*n*)-t2(*n*)), determination of the zero-crossing is more difficult and imprecise. Accordingly, for at least one embodiment, zero-crossing detection occurs with respect to induced currents by the first inductive coils L1 on the primary side of the transformer TR1. For other embodiments, zero-crossing detection may occur based upon differential voltages across the top terminal XT versus the bottom terminal XB.

It is to be appreciated that the zero-cross received signal 714 for the phase detecting PAS sensor 700 commonly will not need to be diminished by use of a dampening element, such as dampening element 602.

Figure 8:
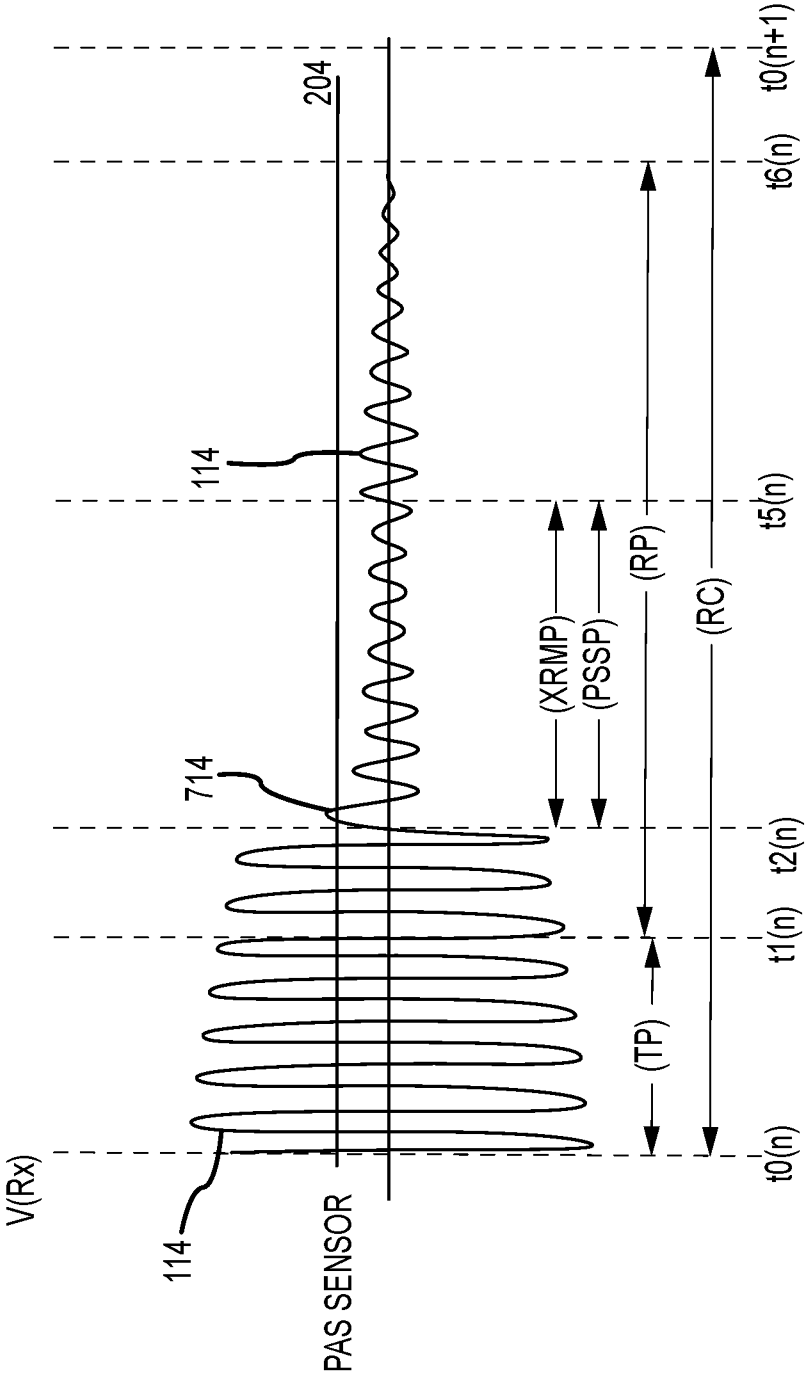
FIG. 8 illustrates a received signal over time, as received by a receiver for a phase detecting PAS sensor and in accordance with at least one embodiment of the present disclosure.

As shown in FIG. 8, a zero-cross reverberation measurement period (XRMP) may also substantially begin a time t2(*n*). For at least one embodiment, t2(*n*) occurs within the determined time of when the zero-cross received signal 714 crosses the receiver input limit 204. It is to be appreciated, that times t3(*n*) and t4(*n*) are not used and, instead, the XRMP may begin when the zero-crossing is detected by the phase detector 702 and the PSSP is activated therewith, such as at time t2(*n*).

It is to be appreciated that even when using the zero-cross embodiment, a DC shift component may still arise due to imprecise timing, component delays, or otherwise. Accordingly and for at least one embodiment of the present disclosure, a combined PAS sensor may include both the dampening element 602 and the phase detector 702.

Further and for at least one embodiment of a combined PAS sensor, the control signals 704 provided by the phase detector 702 to the first and second transmit switches XS1/XS2 may also be provided, e.g., via direct coupling, via processing by the digital control component 108 or otherwise to the dampening element 602. Thus, for at least one embodiment of a combined PAS sensor, time t3(*n*) may occur even earlier during the PSSP by use of zero-crossing detection and dampening of the received signal 114.

Figure 9:
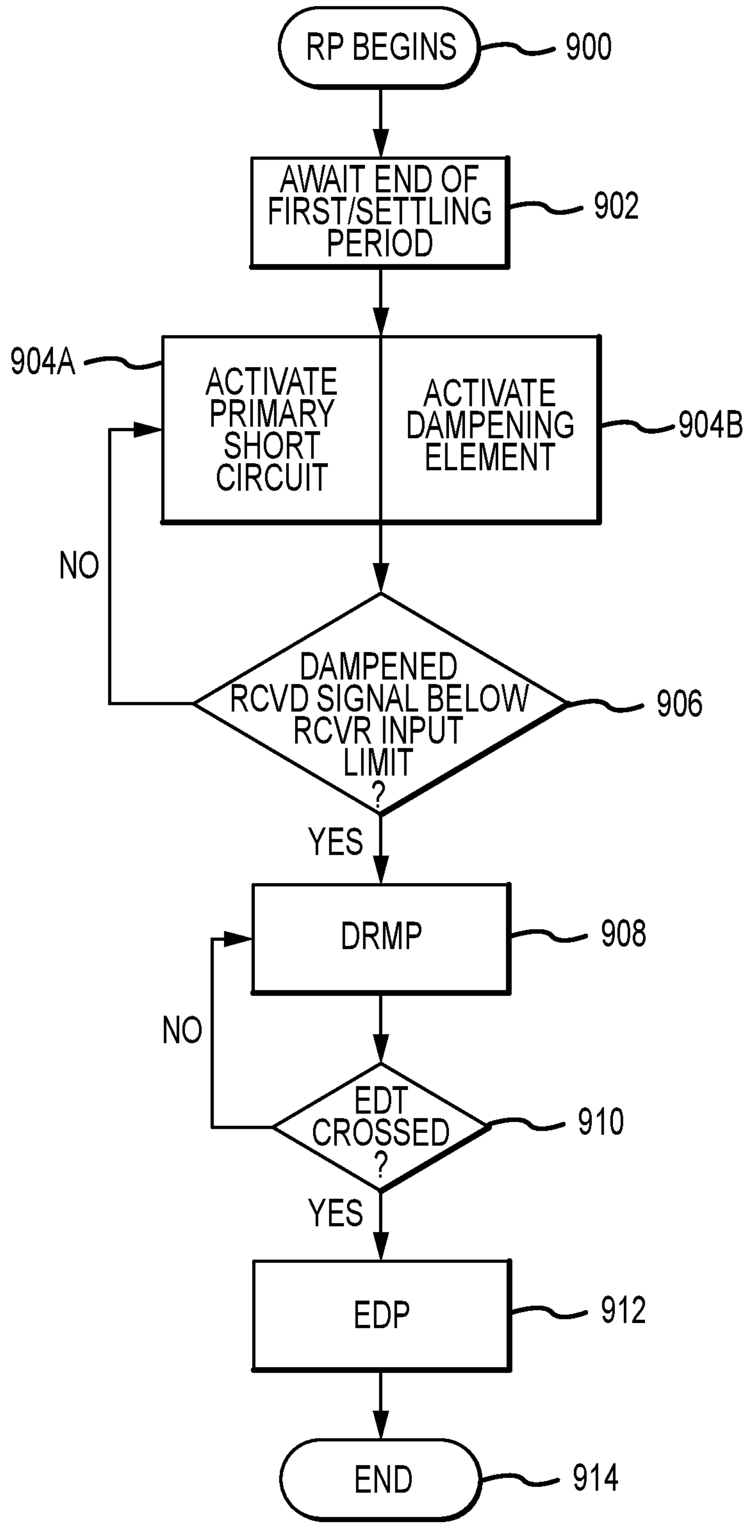
FIG. 9 is a flow chart illustrating a process for using a dampening PAS sensor to dampen a DC shift otherwise present in a received signal and in accordance with at least one embodiment of the present disclosure.

As shown in FIG. 9, a process for dampening the DC shift in accordance with an embodiment of the present disclosure begins with a beginning (e.g., at time t1(*n*)) of the reverberation period (RP), as per Operation 900.

Per Operation 902, the process may include awaiting a first/settling period, such as the settling period from t1(*n*)-t2(*n*). It is to be appreciated that for at least one embodiment, the first/settling period may be a previously determined period. For another embodiment, the first/settling period may be based upon measurements of the received signal 114, with the end of the first/settling period being based upon the received signal 114 presenting one or more pre-determined signal characteristics. Examples of such predetermined signal characteristics may include, but are not limited to, frequency, phase, and amplitude. After the first/settling period has ended, the process proceeds.

Per Operation 904A, the process may include activating the primary short circuit. Per Operation 904B, the process may include activating the dampening element. As discussed above and for at least one embodiment of the present disclosure, activation of the primary short circuit and the dampening element occur substantially simultaneously.

Per Operation 906, the process may include awaiting a detection of the dampened received signal being below the receiver input limit.

Per Operation 908, the process may include analyzing the dampened received signal to determine one or more operating characteristics of the PAS sensor.

Per Operation 910, the process may include monitoring of the dampened received signal for a crossing of the echo detection threshold (EDT).

Per Operation 912, the process may include the echo detection period (EDP). As discussed above, during EDP, the received signal 114 is predominately influenced by received echo signals with such echo signals being useful in detecting obstacles.

Per Operation 914, the process ends and a new operating cycle may begin, returning again to Operation 900 for such next operating cycle.

Figure 10:
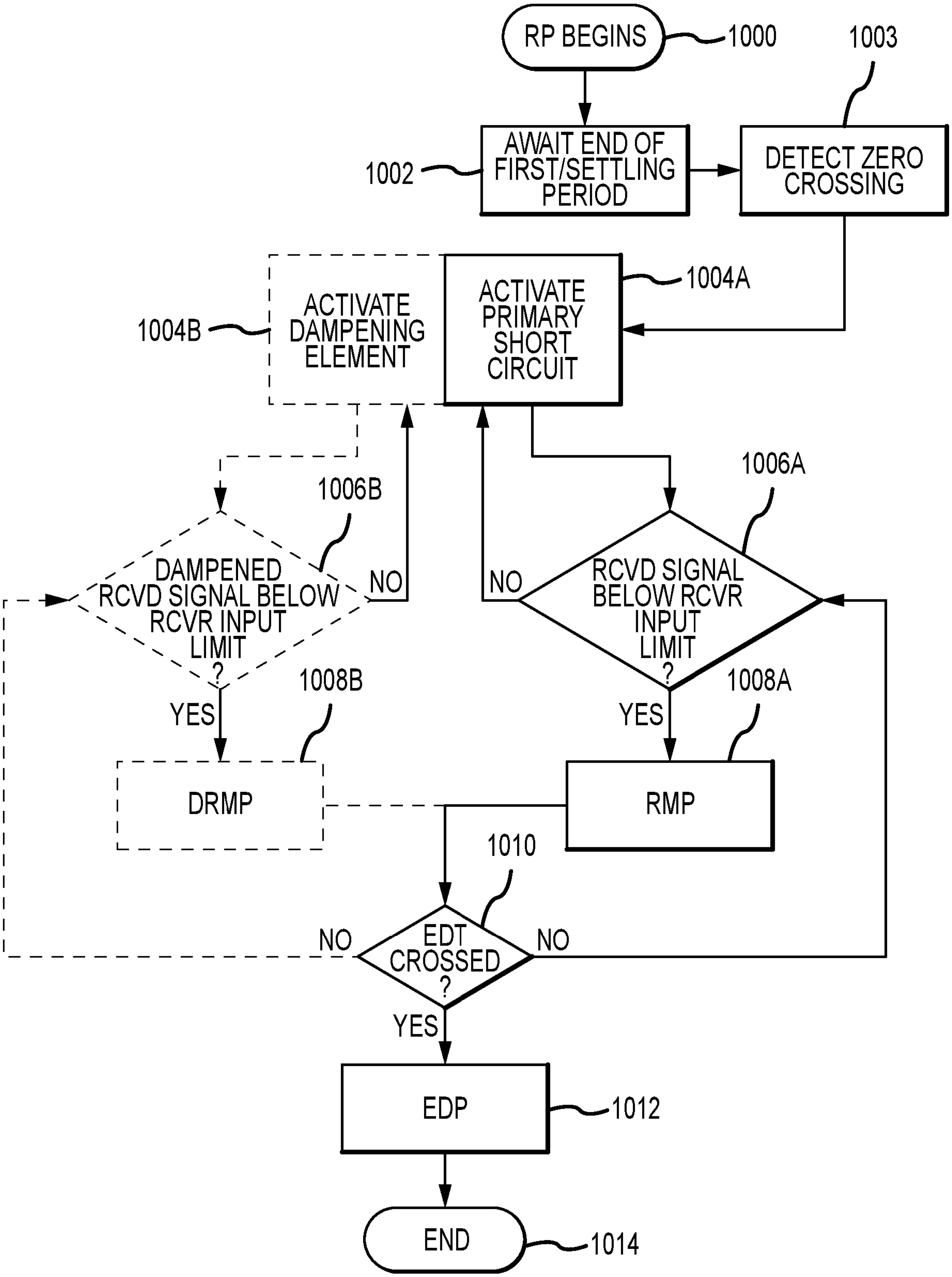
FIG. 10 is a flow chart illustrating a processing for using a phase detecting PAS sensor to prevent a DC shift from otherwise occurring in a received signal and in accordance with at least one embodiment of the present disclosure.

As shown in FIG. 10, a process for eliminating a DC shift in a received signal for a PAS sensor and accordance with an embodiment of the present disclosure begins with a beginning (e.g., at time t1) of the reverberation period (RP), as per Operation 1000.

Per Operation 1002, the process may include awaiting a first/settling period, such as the settling period from t1-t2. It is to be appreciated that for at least one embodiment, the first/settling period may be a previously determined period. For another embodiment, the first/settling period may be based upon measurements of the received signal 114, with the end of the first/settling period being based upon the received signal 114 presenting one or more pre-determined signal characteristics. Examples of such predetermined signal characteristics may include, but are not limited to, frequency, phase, and amplitude. After the first/settling period has ended, the process proceeds.

Per Operation 1003, the process may include awaiting detection of a zero-crossing of the received signal 114, a detectable phase change in the transmitter voltage or the transducer voltage, a detectable change in the received voltage, or otherwise.

Per Operation 1004A, the process may include activating the primary short circuit a determined time after the detected zero-crossing of the received signal 114, a detectable phase change in the transmitter voltage or the transducer voltage, a detectable change in the received voltage, or otherwise.

Per optional Operation 1004B, the process may further include dampening any remaining DC shift by activating the dampening element. As discussed above and for at least one embodiment of the present disclosure, activation of the primary short circuit and the dampening element occur substantially simultaneously.

Per Operation 1006A/1006B, the process may include awaiting a detection of the received signal or the dampened received signal (when Operation 1004B is performed) being below the receiver input limit.

Per Operation 1008A/1008B, the process may include analyzing the undampened or dampened received signal, as appropriate and based upon whether Operation 1004B is performed, to determine one or more operating characteristics of the PAS sensor.

Per Operation 1010, the process may include monitoring of the (un)dampened received signal for a crossing of the echo detection threshold (EDT).

Per Operation 1012, the process may include the echo detection period (EDP). As discussed above, during EDP, the received signal 114 is predominately influenced by received echo signals with such echo signals being useful in detecting obstacles.

Per Operation 1014, the process ends and a new operating cycle may begin, returning again to Operation 100 for such next operating cycle.

It is to be appreciated that the operations described above with reference to FIGS. 9 and 10 are illustrative only and are not intended herein to occur, for all embodiments of the present disclosure, in the order described, in sequence, or otherwise. One or more operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A sensor, comprising:

a transformer having a primary side and a secondary side;

a primary short circuit coupled to the primary side of the transformer;

a transducer coupled to the secondary side of the transformer and configured to generate a receive signal during a portion of at least one of a reverberation period or an echo period; and a phase detector configured to activate the primary short circuit in response to a zero-crossing of the receive signal.

2. The sensor of claim 1, further comprising:

a damping element coupled to the transducer and configured to damp a DC shift voltage in the receive signal during at least a portion of the reverberation period.

3. The sensor of claim 2, further comprising:

a digital control component configured to send control signals to the phase detector.

4. The sensor of claim 2, wherein the damping of the DC shift voltage by the damping element and the activation of the primary short circuit by the phase detector are performed substantially simultaneously.

5. The sensor of claim 2, further comprising:

a controller configured to activate the primary short circuit and the damping element after a settling stage of the reverberation period.

6. The sensor of claim 2, further comprising:

a capacitor having a first end coupled to the transducer and a second end coupled to a damping resistor and to a high terminal of an amplifier; and wherein when the primary short circuit is activated, and absent activation of the damping element, the capacitor is configured to increase the receive signal by the DC shift voltage.

7. The sensor of claim 2, further comprising:

a controller configured to activate the damping element and the primary short circuit via the phase detector.

8. The sensor of claim 1, further comprising:

a transmitter coupled to a primary side of the transformer, the phase detector being configured to activate the primary short circuit via the transmitter.

9. The sensor of claim 8, wherein the transmitter includes a first transmit switch and a second transmit switch, the phase detector is configured to activate the primary short circuit using the first transmit switch and the second transmit switch.

10. The sensor of claim 9, wherein the first transmit switch and the second transmit switch are activated by the phase detector within a threshold time of a detectable change in the receive signal.

11. The sensor of claim 10, wherein the detectable change in the receive signal is based on a time derived phase of differential outputs of the transmitter.

12. The sensor of claim 1, wherein the transducer is coupled in parallel with a parallel resistor.

13. The sensor of claim 1, wherein in response to activation of the primary short circuit and absent damping of a DC shift voltage, the receive signal has an amplitude increased by the DC shift voltage above a receiver input limit.

14. The sensor of claim 1, wherein the echo period begins when the receive signal crosses an echo detection threshold, the sensor further comprising:

a controller configured to deactivate the primary short circuit and damping prior to a beginning of the echo period.

15. A process, comprising:

detecting a change in a signal generated by a sensor during at least a reverberation period; and activating a primary short circuit, coupled to a primary side of a transformer, using a phase detector after detecting the change in the signal such that a parallel resonance on a secondary side of the transformer during the reverberation period is mitigated.

16. The process of claim 15, further comprising:

activating the primary short circuit and a damping element substantially simultaneously.

17. The process of claim 16, wherein the damping element is configured to decrease a receive signal while the primary short circuit is activated.

18. A process, comprising:

activating a primary short circuit coupled to a primary side of a transformer using a phase detector; and activating a damping element coupled to a transducer coupled to a secondary side of the transformer, the transducer being configured to generate a receive signal during at least a transmission period and a reverberation period, the damping element being configured to damp the receive signal during at least a portion of the reverberation period.

19. The process of claim 18, wherein the primary short circuit and the damping element are activated substantially simultaneously.

20. The process of claim 18, wherein the receive signal is damped by the damping element prior to amplification of the receive signal by an amplifier stage.

21. The process of claim 18, wherein the activating of the primary short circuit and the activating the damping element facilitates at least mitigating a parallel resonance during a reverberation period measurement and damping a DC shift voltage.

* * * * *